United States Patent [19]
Fujioka et al.

[11] Patent Number: 4,894,818
[45] Date of Patent: Jan. 16, 1990

[54] OPTICAL PACKET SWITCHING SYSTEM USING MULTI-STAGE COMBINATION OF LIGHT TRIGGERING SWITCHES

[75] Inventors: Masanobu Fujioka, Ohmiya; Katsuyuki Utaka, Musashino, both of Japan

[73] Assignee: Kokusai Denshin Denwa Kabushiki Kaisha, Tokyo, Japan

[21] Appl. No.: 259,157

[22] Filed: Oct. 18, 1988

[30] Foreign Application Priority Data
Oct. 22, 1987 [JP] Japan .................................. 62-265386

[51] Int. Cl.$^4$ ............................................. H04B 9/00
[52] U.S. Cl. ............................................ 370/3; 370/1; 370/60; 455/601
[58] Field of Search ................... 455/600, 612; 370/1, 370/3, 60, 94; 350/96.13, 96.15; 379/258, 259

[56] References Cited

U.S. PATENT DOCUMENTS

| | | | |
|---|---|---|---|
| 4,702,550 | 10/1987 | Sano | 370/3 |
| 4,731,878 | 3/1988 | Vaida | 455/600 |
| 4,783,851 | 11/1988 | Inou | 455/612 |

FOREIGN PATENT DOCUMENTS

2139443 11/1984 United Kingdom ................ 455/600

Primary Examiner—Robert L. Griffin
Assistant Examiner—L. Van Beek
Attorney, Agent, or Firm—Emmanuel J. Lobato; Robert E. Burns

[57] ABSTRACT

An optical packet switching system is disclosed in which a routing signal is composed of a wavelength-multiplexed optical signal and an information part and a packet end code are also composed of optical signals. In accordance with the present invention, a switching network is formed by a multi-stage combination of light triggering switches which are closed depending on the presence or absence of a particular wavelength in the wavelength-multiplexed optical signal.

5 Claims, 8 Drawing Sheets

OPTICAL PACKET SWITCHING SYSTEM USING MULTI-STAGE COMBINATION OF LIGHT TRIGGERING SWITCHES

BACKGROUND OF THE INVENTION

The present invention relates to an optical packet switching system which permits high-speed efficient switching of an optical signal without converting it into an electrical signal, in a wide band communication network formed mainly using optical fibers.

In the conventional packet switches, a packet transmitted as an optical signal over a transmission line must be once converted into an electrical signal; therefore, the prior art switches have the shortcomings of involving a large-scale arrangement and impairing the high-speed property of light.

SUMMARY OF THE INVENTION

An object of the present invention is to provide an optical packet switching system which is relatively small in scale but permits full utilization of the high-speed property of light.

The feature of the present invention resides in that in an optical packet switching system in which a routing signal composed of a wavelength-multiplexed optical signal and an information part and a packet end code are also composed of optical signals, a switching network is formed by a multi-stage combination of light triggering switches which are turned-ON or OFF depending on the presence or absence of a particular wavelength in the wavelength-multiplexed signal.

BRIEF DESCRIPTION OF THE DRAWINGS

The present invention will be described in detail below in comparison with the accompanying drawings, in which:

FIGS. 4A ad 4B are diagrams illustrating, by way of example, the basic arrangement of the packet switch of the present invention and the basic packet structure, for explaining the principle of the invention;

DETAILED DESCRIPTION

To make differences between prior art and the present invention clear, examples of prior art will first be described.

Figure 1:
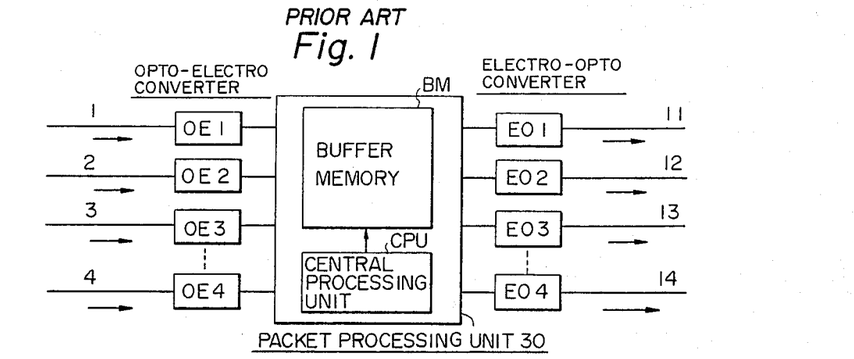
FIGS. 1 and 2 are block diagrams showing, by way of example, the arrangements of conventional packet switches.

FIG. 1 shows, by way of example, the arrangement of a conventional packet switch. In FIG. 1 reference numerals 1, 2, 3 and 4 indicate incoming lines to the packet switch, each formed by an optical fiber cable and transferring a packet, OE1, . . . OE4 O/E converters for converting an optical signal into an electrical signal, 11, 12, 13 and 14 outgoing lines from the packet switch, each formed by an optical fiber cable and transferring a packet, EO1, . . . EO4 E/O converters for converting an electrical signal into an optical signal, and 30 a packet processing unit. In the packet processing unit 30, reference character BM designates a buffer memory which is shared by packets in all routes, and CPU a central processing unit. With the arrangement shown in FIG. 1, input packets to the packet switch are once converted by the O/E converters OE1, . . . OE4 into electrical signals and then input into the packet processing unit 30, in which they are once stored in the common buffer memory BM. The thus stored packets ar analyzed and determined as to the routes to which they are transferred, under control of the central processing unit CPU, and the packets are converted by the E/O converters EO1, . . . EO4 into optical signals, thereafter being provided to the determined routes on the outgoing lines 11, 12, 13 and 14, respectively.

Figure 2:
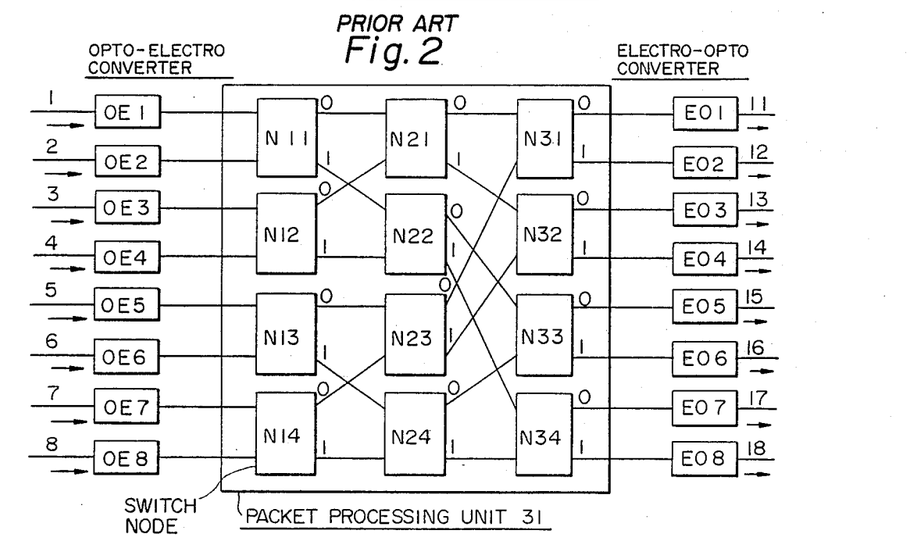
Figure 3:
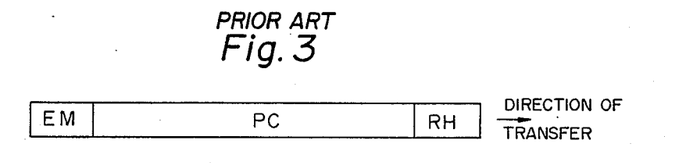
FIG. 3 is a diagram showing an example of a conventional packet structure.

FIG. 2 shows another example of the arrangement of the conventional packet switch in which the packet processing unit 30 is replaced by a self-routing type switching network. In FIG. 2 reference numerals 1, . . . 8 identify incoming lines, each formed by an optical fiber cable for transferring a packet to the packet switch, OE1, . . . OE8 O/E converters for converting an optical signal into an electrical signal, 11, . . . 18 outgoing lines, each formed by an optical fiber cable for transferring a packet from the packet switch, EO1, . . . EO8 E/O converters for converting an electrical signal into an optical signal, and 31 a packet processing unit. In the packet processing unit 31 reference characters N11, N12, . . . N34 two-by-two switch nodes. FIG. 3 shows an example of the packet structure for use in the example depicted in FIG. 2. Reference character RH indicates a routing header composed of a 3-bit signal, PC packet contents, and EM a code indicating the end of the packet. With the arrangement shown in FIG. 2, packets transferred over the incoming lines 1, 2, . . . 8 are once converted by the O/E converters OE1, OE2, . . . OE8 into electrical signals and then input into the packet processing unit 31. In the packet processing unit 31 each of the first-stage switch nodes N11, N12, N13 and N14 selects one of the second-stage switch nodes N21, N22, N23 and N24 as shown, depending on whether the first bit of the routing header RH of the packet is a state "0" or "1", and transfer the packet to the selected switch node. Similarly, each of the second-stage switch nodes N21, N22, N23 and N24 selects one of the third-stage switch nodes N31, N32, N33 and N34 as shown, depending on whether the second bit of the routing header RH is a state "0" or "1", and transfer the packet to the selected switch node. Each of the third-stage switch nodes N31, N32, N33 and N34 selects one of the outgoing lines 11, 12, . . . 18, depending on whether the third bit of the routing header RH of the packet is a state "0" or "1", and transfer the packet to the selected outgoing line. In this instance, the packets transferred as electrical signals are converted by the E/O converters into optical signals for the transfer over the outgoing lines 11, 12, . . . 18. For example, when a packet whose routing header RH is "011" in descending order is transferred as an optical signal over the incoming line 5, the packet is converted by the O/E converter OE5 into an electrical signal and then input into the two-by-two switch node N13 in the packet processing unit 31. Since the first bit of the routing header RH is a state "0", the switch node N13 transfers the packet to the second-stage two-by-two switch node N23. Next, since the second bit of the routing header RH is a state "1", the switch node N23 transfers the packet to the third-stage two-by-two switch node N32. Then, since the third bit of the routing header RH is a state "1", the switch node N32 provides the packet to the E/O converter EO4 for transfer over the outgoing line 14. The E/O converter EO4 converts the packet input thereto as an electrical signal into an optical signal, which is provided on the outgoing line 14. By the above-described operation, packets having the same routing header RH are all transferred to the same outgoing route. Each of the two-by-two switch nodes N11, N12, ... N34 may have a function of temporarily storing a packet when the packet cannot be sent to the node of the subsequent stage or the outgoing line because it is occupied by the previous packet.

In the conventional packet switches such as shown in FIGS. 1 and 2 a packet transmitted as an optical signal over a transmission line must be once converted into an electrical signal; therefore, the prior art switches have the shortcomings of involving a large-scale arrangement and impairing the high-speed property of light.

With reference to the accompanying drawings the present invention will hereinafter be described in detail.

Figures 4A, 4B:
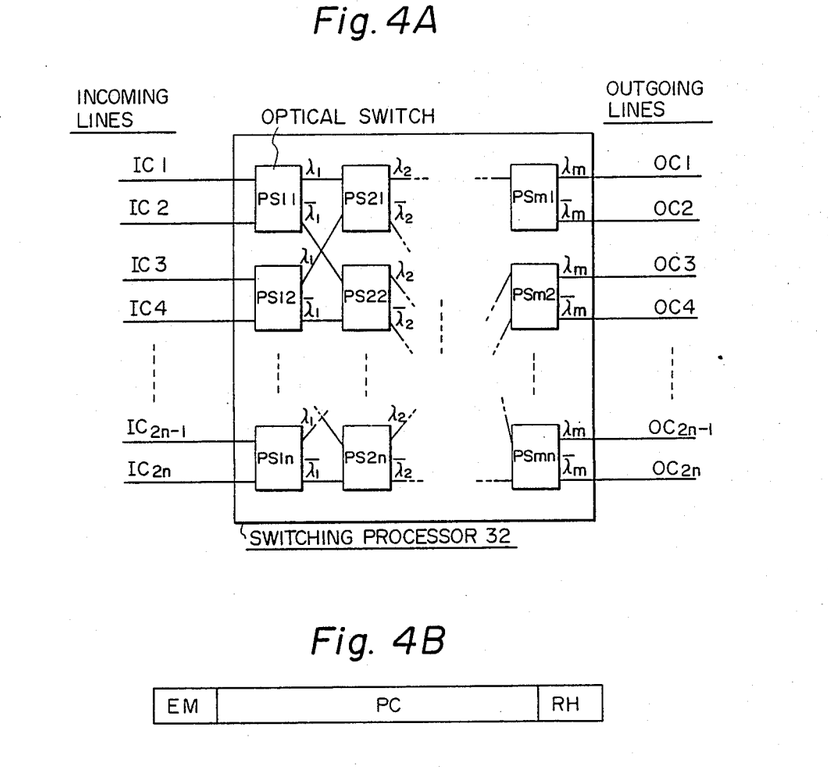

FIGS. 4A and 4B illustrate an embodiment of the present invention, FIG. 4A showing the basic arrangement of the packet switch and FIG. 4B the basic structure of the packet. In FIG. 4A reference characters $IC_1$, $IC_2$, ... and $IC_{2n}$ indicate incoming lines to the packet switch $OC_1$, $OC_2$, ... and $OC_n$ outgoing lines, 32 a switching processor, and $PS_{11}$, $PS_{12}$, ... and $PS_{mn}$ in the switching processor 32 light triggering two-by-two optical switches. When "n" is a power of 2, $m = \log_2 n + 1$. In FIG. 4B reference character RH designates a routing header, which is a wavelength-multiplexed optical signal indicating routing information in the form of the presence or absence of wavelengths $\lambda_1$, $\lambda_2$, ... and $\lambda_m$, PC packet contents composed of optical signals, and EM an optical signal indicating the end of the packet. With the basic arrangement shown in FIG. 4A, when receiving the routing header of an input packet of the structure shown in FIG. 4B from the incoming lines $IC_1$, ... and $IC_{2n}$, the two-by-two optical switches $PS_{11}$, $PS_{12}$, ... and $PS_{1n}$ in the packet processing unit 32 each select, in accordance with the presence or absence of the wavelength $\lambda_1$ in the routing header RH, one of the next-stage two-by-two optical switches $PS_{21}$, $PS_{22}$, ... and $PS_{2n}$ to which the packet is to be transferred, and each optical switch retains its connection to the selected second-stage two-by-two optical switch until after the routing header RH, the packet contents PC and the packet end signal EM are all transferred thereto. Similarly, when supplied with the routing header RH of the packet, the second-stage two-by-two optical switches $PS_{21}$, $PS_{22}$, ... and $PS_{2n}$ each select, in accordance with the presence or absence of the wavelength $\lambda_2$ in the routing header RH, one of the next-stage two-by-two optical switches $PS_{31}$, $PS_{32}$, ... and $PS_{3n}$ to which the packet is to be transferred, and each optical switch retains its connection to the selected third-stage two-by-two optical switch until after the routing header RH, the packet contents PC and the packet end signal EM are all transferred thereto. In a similar manner the third-, fourth-, ... and m-th-stage two-by-two optical switches perform the switching operation, providing the packets on the outgoing lines $OC_1$, $OC_2$, ... and $OC_{2n}$. In this case, packets which have the routing header RH composed of the same combination of the wavelength $\lambda_1$, $\lambda_2$, ... and $\lambda_m$ are provided on the same outgoing line.

In the above-described embodiment of the packet switch of the optical packet switching system according to the present invention, the two-by-two switch nodes N11, N12, ... and N34 in FIG. 2 are substituted by the two-by-two optical switches PS11, PS12, ... and PS34 shown in FIG. 4A and the opto-electro converters OE1, OE2, ... and OE8 and the electro-opto converters EO1, EO2, ... and EO8 are eliminated. Accordingly, the conventional O/E converters and E/O converters are unnecessary; so that the packet switch can be made relatively small in scale and the high-speed property of light can be fully utilized.

Further, the use of the wavelength multiplexing of light lessens the influence of noise, and hence improves the signal to noise ratio.

Moreover, since the routing header (RH) which becomes an overhead in the data transfer can be formed by multiplexing a plurality of wavelengths in a short time, it is possible to implement a high efficiency packet communication with a small overhead length.

As the afore-mentioned two-by-two light triggering optical switch, "a light triggering switch" can be employed on which a patent application Ser. No. 07/259,167 was filed by the same inventors of this application on the even date therewith.

A description will be given of the arrangement of the light triggering switch which selectively performs the switching operation in accordance with the presence or absence of a particular wavelength.

The light triggering type switch comprises an optical switch section which is controlled in accordance with the presence or absence of a wavelength which has routing information, and an optical memory section which is equipped with a function of controlling the storage and resending of a lower-priority one of two input packets. The device constructions of respective sections differ from each other depending on the durations of routing information, packet presence information and packet end information pulses. Then a description will be given of four kinds of wavelength-multiplexed optical signals classified as shown in FIGS. 5A to 5D. In FIG. 5A to 5D, $\lambda_s$ is a wavelength indicating the presence of a packet, $\lambda_e$ a wavelength indicating the end of the packet, $\lambda_D$ the wavelength of a data signal, and $\lambda_1$, $\lambda_2$ and $\lambda_3$ wavelengths indicating routing information. While this example is shown to employ three-wavelengths, i.e. three-stage switch structure, it is possible to increase the number of stages by increasing the number of essentially different wavelengths.

(1) Optical Switch Section (Embodiment 1)

Figure 5A:
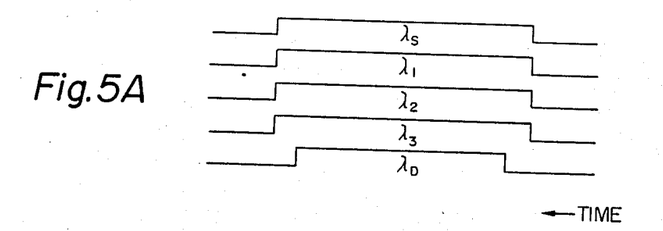
FIGS. 5A, 5B, 5C and 5D show four kinds of packet structures for use in the optical packet switching system of the present invention.
Figure 5B:
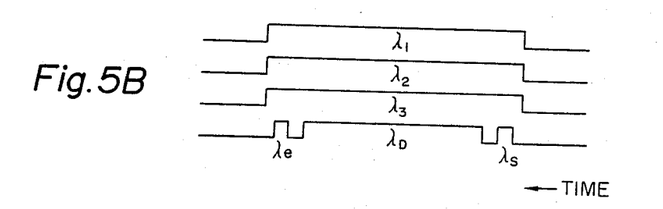
Figure 6:
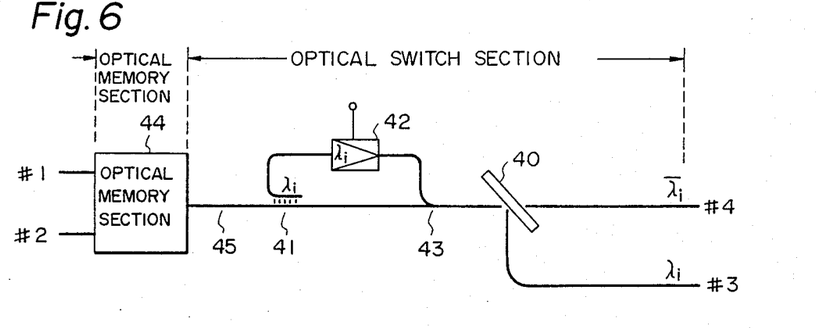
FIGS. 6, 7, 8, 9, 10 and 11 are diagrams illustrating examples of the arrangement of an optical switch section forming a two-by-two optical switch for use in the present invention.

FIG. 6 shows, by way of example, the arrangement of the switch section of the light triggering type switch for use in the present invention. The packet has a structure in which a routing information pulse of the wavelength $\lambda_i$ (where i=1, 2, 3) covers the entire length of the packet, as depicted in FIGS. 5A and 5B. The optical switch section of this embodiment comprises a nonlinear reflector 40, a branching filter 41, an optical amplifier 42 and optical coupler 43. Reference numeral 44 indicates an optical memory section described later, which has incorporated therein a feature of preferentially providing on a signal line 45 an earlier one of input signals from channels #1 and #2 while at the same time storing the other input signal temporarily. Paths of optical signals are indicated by thick lines. The nonlinear reflector 40 totally reflects signal light when its intensity is markedly high but permits the passage therethrough of the signal light when its intensity is low. This reflector can be obtained using a semiconductor crystal of a large nonlinearity constant, semiconductor-doped glass, or an oxide such as ZnO.

Although this embodiment is shown to utilize reflection at the surface of the material forming the reflector, it is also possible to employ a waveguide type optical switch proposed in Japan. Pat. Appln. No. 9942/87 corresponding to U.S. Pat. No. 4,805,975 filed by the applicant of this application.

This embodiment operates in the following manner: Where a packet input from the channel #1 or #2 contains a routing pulse of the wavelength $\lambda_i$ (where i=1, 2, or 3), the pulse is branched by the branching filter 41 for the wavelength $\lambda_i$ and amplified by the optical amplifier 42 for the wavelength $\lambda_i$. The amplified output is provided again on the initial signal line 45 by the optical coupler 43 and applied to the nonlinear reflector 40. In this instance, since the pulse of the wavelength $\lambda_i$ has been amplified to a sufficiently high light intensity, the nonlinear reflector 40 becomes totally reflecing; so that subsequent signals in the packet are all provided to a channel #3. Since the pulse of the wavelength $\lambda_i$ ($\lambda_i$ pulse) ends at the same time as the packet is entirely reflected to the channel #3, the nonlinear reflector 40 automatically returns to its initial non-reflecting state. On the other hand, when the packet does not contain the $\lambda_i$ pulse, the nonlinear reflector 40 remains unchanged and permits the passage therethrough of all signals of the packet to a channel #4. In this way, the switching operation is selectively carried out depending on whether the $\lambda_i$ pulse is contained in the packet.

Figure 5C:
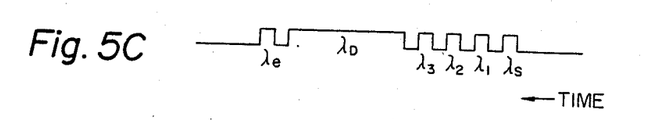
Figure 7:
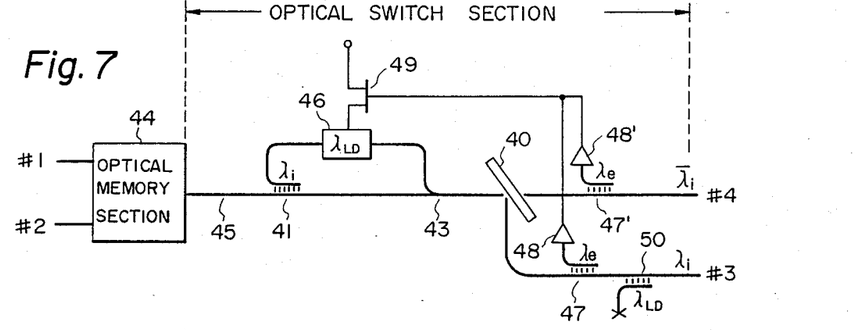

FIG. 7 illustrates a second example of the optical switch section for use in the present invention, which is applied to the packet structure depicted in FIG. 5C. The packet shown in FIG. 5C includes a packet presence pulse of the wavelength $\lambda_s$ in the header, portion and each routing pulse of the wavelength $\lambda_i$ (where i=1, 2, 3) followed by a data signal of the wavelength $\lambda_D$ and the packet end pulse. In this case, since the routing pulse is short, a semiconductor laser 46 which responds to light of the wavelength $\lambda_i$ to oscillate and emit continuous high-intensity light of a wavelength $\lambda_{LD}$ is employed in place of the optical amplifier 42 for the $\lambda_i$ pulse shown in FIG. 6.

As is the case with FIG. 6, the output light of the semiconductor laser 46 is provided on the signal line 45 by the optical coupler 43, putting the nonlinear reflector 40 into its totally reflecting state. When the packet is provided at #3 or #4 depending on whether it contains the routing pulse $\lambda_i$, the packet end pulse of the wavelength $\lambda_e$ is branched by a branching filter 47 or 47' therefor and subjected to a photoelectric conversion by a photodetector 48 or 48', and the converted output is applied to a normally-ON type FET switch 49 on a power supply line to the semiconductor laser 46, turning OFF FET switch 49 on a power supply line to the semiconductor laser 46, turning OFF the switch 49. By this, the power supply to the semiconductor laser 46 is temporarily stopped and at the same time its oscillation is also stopped, allowing the nonlinear reflector 40 to be restored to its initial state. The output light of the semiconductor laser 46 is provided also to the channel #3, but this is unnecessary at subsequent stages, and hence is removed by a branching filter 50 for the wavelength $\lambda_{LD}$. Incidentally, thin lines are paths of electric signals, and this applies to the following description.

Figure 5D:
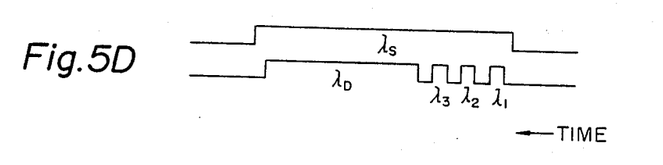
Figure 8:
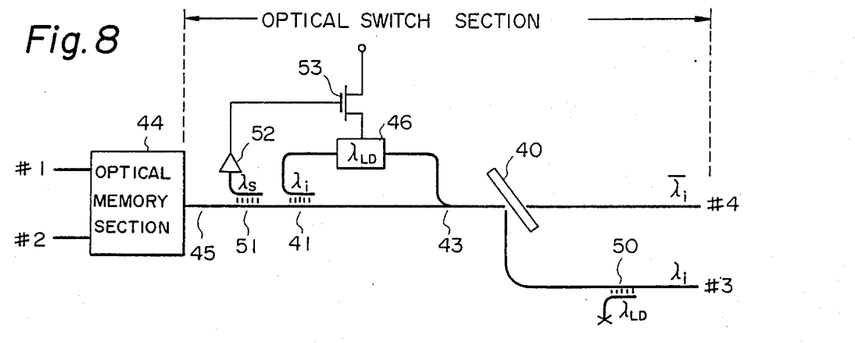

FIG. 8 illustrates a third example of the optical switch section for use in the present invention, which is applied to the packet structure shown in FIG. 5D in which routing pulses are included in the packet head portion but the packet presence pulse ($\lambda_s$) is long enough to cover the entire length of the packet. This example is identical with the example of FIG. 7 in the mechanism of actuating the nonlinear reflector 40 but differs therefrom in that the packet presence pulse $\lambda_s$ is branched by a branching filter 51 and subjected to a photoelectric conversion by a photodetector 52, turning ON a nornally-OFF type FET switch 53 on the power supply line to the semiconductor laser 46. Accordingly, when the routing pulse $\lambda_i$ signal is included in the routing pulses, the semiconductor laser 46 is caused by the injection thereinto of light to oscillate, by which the nonlinear reflector 40 is altered to the totally reflecting state, outputting therethrough the packet to the channel #3. When the pulse $\lambda_i$ is not present, the packet will pass through the nonlinear reflector 40 to the channel #4.

Figure 9:
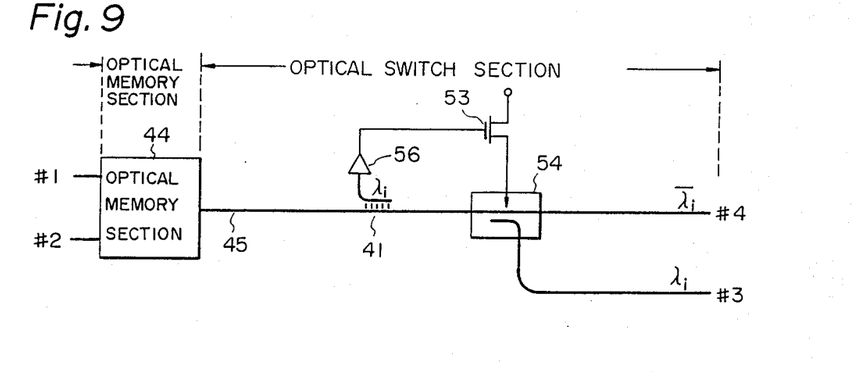
Figure 10:
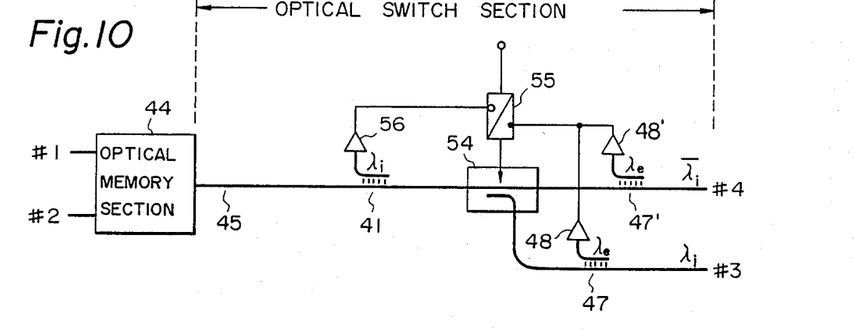
Figure 11:
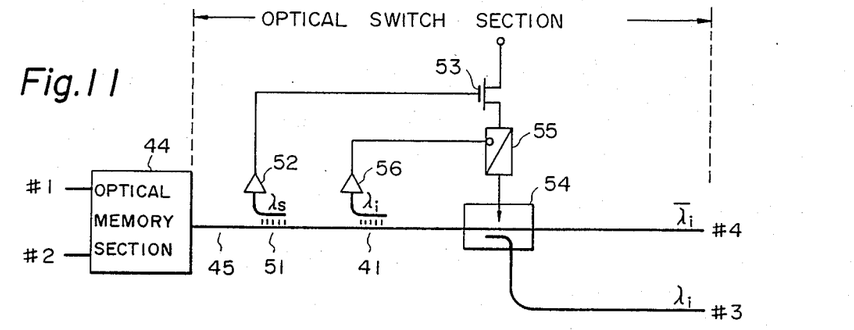

While the examples show in FIGS. 6 to 8 have been described to use the nonlinear reflector 40 as the optical switching element, the present invention is not limited specifically thereto but can also be implemented using an electrically-controlled type optical switching element. FIGS. 9, 10 and 11 illustrate other examples employing the electrically-controlled type optical switching element, corresponding to the examples depicted in FIGS. 6, 7 and 8, respectively. Reference numeral 54 indicates the electrially-controlled type optical switch, and the degree of coupling between directional coupling waveguides or total reflection at the crossing portion of crossing waveguides, formed on a ferro-electric substrate as of $LiNbO_3$ or semiconductor substrate, is controlled by an electric signal. That is to say, the routing pulse ($\lambda_i$) is branched and converted to an electric signal, which is used to turn ON and OFF the power supply to the optical switch, thereby switching the packet between the channels #3 and #4. Reference numeral 55 identifies a flip-flop, which is turned ON by a signal applied to its white-circled terminal and OFF by a signal to its black-circled terminal.

The operation timing of the optical switching element and the timing of optical signals of the packet are obtained mainly by optimizing the length of the optical signal line 45 formed of an optical fiber. Further, each control signal can be obtained simply by branching a portion of light of each of the wavelengths $\lambda_s$, $\lambda_i$ and $\lambda_e$, and accordingly, all information is maintained unchanged and propagated to the subsequent stages. An optical amplifier may also be provided additionally, if required.

(2) Optical Memory Section

Figure 12:
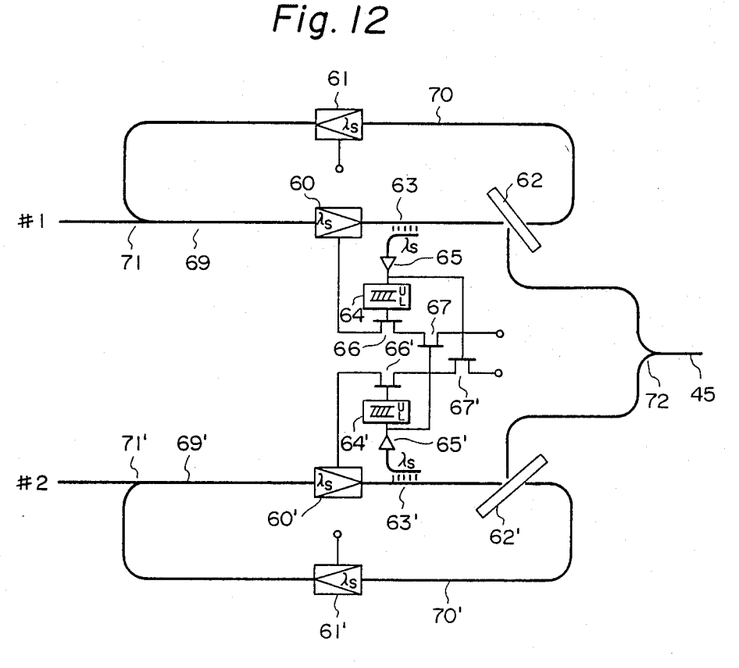
FIGS. 12 and 13 are diagrams illustrating examples of circuit arrangements of respective parts of an optical memory section.

FIG. 12 illustrates a first example of the optical memory section according to the present invention. This example is applied to the packet structures shown in FIG. 5A and 5D in which the packet presence pulse of the wavelength $\lambda_s$ covers the entire length of the packet, and the passage of a higher-priority packet and the storing and resending of a lower-priority packet are controlled in accordance with the presence or absence of the wavelength $\lambda_s$. Reference numerals 60, 60', 61 and 61' designate $\lambda_s$ pulse optical amplifiers, 62 and 62' nonlinear reflectors, 63 and 63' $\lambda_s$ pulse branching filters, 65 and 65' photodetectors, 64 and 64' discrimination circuits each of which outputs an electric signal only when the input electric signal thereto has a level intermediate between predetermined upper (U) and lower (L) levels, 66, 66', 67 and 67' normally-ON type FET switches, 69 and 69' main optical signal lines, 70 and 70' optical loop lines, 71, 71' and 72 optical couplers, and 45 an optical memory output line connected to the afore-mentioned optical switching section. The lines are optical signal lines formed mainly of optical fibers and thin lines are electric signal lines.

Next, a description will be given of the principle of operation of the optical memory section of this example.

Now, let it be assumed that a packet #1 is input from the channel #1. The packet presence pulse (of the wavelength $\lambda_s$) is amplified by the optical amplifier 60 and applied to the nonlinear reflector 62, putting it into the totally reflecting state. Since the $\lambda_s$ pulse extends over the entire length of the packet, the packet is reflected and provided via the optical coupler 72 onto the optical memory output line 45. While the packet #1 is passing through this optical switch section, a portion of the $\lambda_s$ pulse is taken out, as an electric signal, by the $\lambda_s$ pulse branching filter 63 and the photodetector 65, and the electric signal is applied to the normally-ON type FET switch 67' to turn it OFF; so that the amplification degree of the optical amplifier 60' for the $\lambda_s$ pulse on the channel #2 is zero or minus. Consequently, even if a packet #2 is input from the channel #2 at this time, its packet presence pulse (of the wavelength $\lambda_s$) is attenuated and the nonlinear relector 62' permits the passage therethrough of the packet accordingly. As a result of this, the packet #2 enters the optical loop line 70' and goes around the optical loop formed by the main optical signal line 69' and the optical loop line 70' and hence is stored until after the packet #1 passes through the optical memory section. In this instance, the packet presence pulse $\lambda_s$ is amplified by the optical amplifier 61' so as to compensate for its intensity attenuated by the optical amplifier 60' in the OFF state. After the packet #1 has been passed through the optical memory section and provided on its output line 45, the normally-ON type FET switch 67' is turned ON, the packet presence pulse of the packet #2 is amplified, and the nonlinear reflector 62' is put to the totally reflecting state, whereby the packet #2 is provided on the optical memory 60' is turned ON during the passage therethrough of the packet #2 and interrupts it, a portion of the output of the photo-detector 63' is discriminated in level and the optical amplifier 60' is turned ON only before or after the passage therethrough of the packet. According, when the channel #2 is in the ON state, the functions of the channel #1 and the channel #2 are reversed.

While this example employs the nonlinear reflectors 62 and 62', it is also possible to use the afore-mentioned electrically-controlled type optical switch by detecting the $\lambda_s$ pulse in the same manner as in FIG. 9.

FIG. 11 illustrates another example of the optical memory section for use in the present invention, which is applied to the packet structure having the packet presence pulse (of the wavelength $\lambda_s$) at the head thereof and the packet end pulse (of the wavelength $\lambda_e$) at the end thereof, as depicted in FIG. 5B or 5C.

Figure 13:
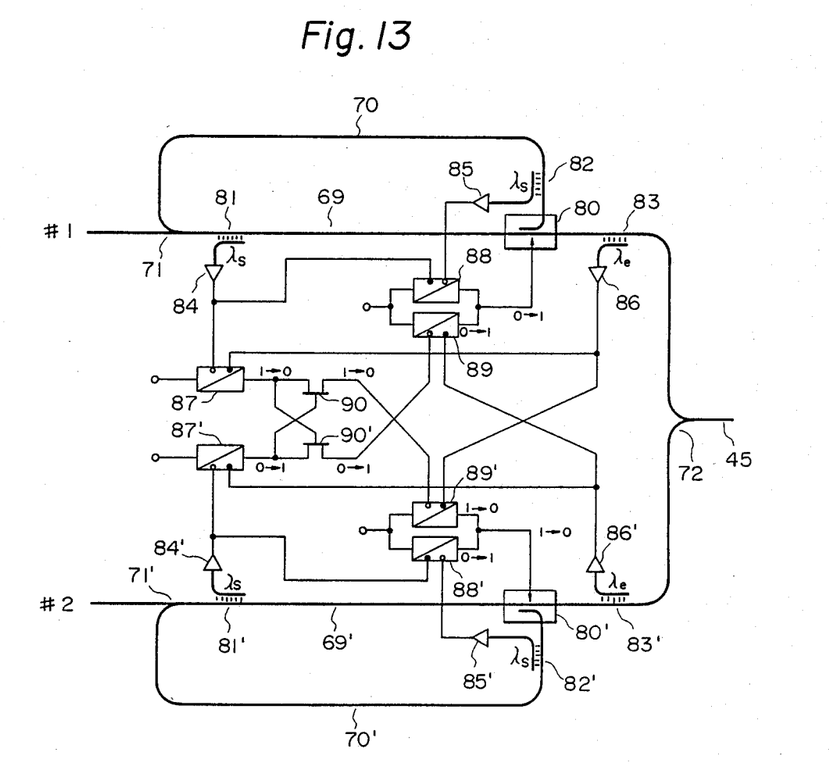

Reference numerals 80 and 80' identify electrically-controlled type optical switches, 81, 81', 82 and 82' $\lambda_s$ pulse branching filters, 83 and 83' $\lambda_e$ pulse branching filters, 84, 84', 85, 85', 86 and 86' photodetectors, 87, 87', 88, 88', 89 and 89' flip-flops (each of which is turned ON by a signal applied to the white-circled terminal and OFF by a signal applied to the black-circled terminal), and 90 and 90' normally-ON type FET switches.

The principle of operation of this example is as follows: When a packet #1 is input from the channel #1, the presence pulse (of the wavelength $\lambda_s$) turns OFF the flip-flop 88 via the branching filter 81 and the photodetector 84. Further, since the flip-flop 89 is normally OFF, no electrical control signal is applied to the optical switch 80. Accordingly, the packet #1 passes through the optical switch 80 and is provided on the optical memory output line 45 via the optical coupler 72. During the transmission of the packet #1 over the main optical signal line 69 the $\lambda_s$ pulse of the packet #1 is provided via the branching filter 81 to the photodetector 84, by which it is converted into an electric signal, which is then applied to the flip-flop 87 to turn it ON, and further the electric signal is provided via the normally-ON type FET switch 90 to the flip-flop 89' to turn it ON, thus switching the optical switch 80' on the channel #2 to the ON state in which it inhibits the passage therethrough of the input optical signal. Accordingly, even if a packet #2 is input from the channel #2 after the packet #1 from the channel #1, the former is bypassed to the optical loop line 70' and circulates around the optical loop composed of the main optical signal line 69' and the optical loop 70' on the channel #2; namely, the packet #2 is stored. Upon detecting the packet end pulse (of the wavelength $\lambda_e$) of the packet #1 by the branching filter 83, the flip-flop 89' is turned OFF. When the $\lambda_s$ pulse of the packet #2 circulating around the loop is detected via the branching filter 81', the flip-flop 88' is turned OFF, and accordingly the packet #2 is allowed to pass throgh the optical switch 80' to the optical memory output line 45. In order to prevent that the packet #2 is cut off by the switching of the optical switch 80' from the ON to the OFF state during the passage therethrough of the packet, the $\lambda_s$ pulse branching filter 82' is provided directly in association with the optical switch 80', by which the optical switch 80' is kept in the ON state while the packet #2 passes therethrough in that state. When the applciation of the packet #2, stored in the optical loop, to the optical memory output line 45 is started, the functions of the #1 channel and the #2 channel are exchanged.

The ON-OFF operation of each element in the optical memory section and the timing of the packet optical signals are obtained by optimizing the lengths of the main optical signal lines 69 and 69' and the optical loop lines 70 and 70' each of which is formed by an optical fiber.

TABLE 1

| Optical Memory Section | Optical Switch Section | | |
|---|---|---|---|
| | FIGS. 6 & 9 | FIGS. 7 & 10 | FIGS. 8 & 11 |
| FIG. 12 | 5A | — | 5D |
| FIG. 13 | 5B | 5C | — |

Table 1 shows combinations of the above-described optical switch and optical memory sections which are applicable to the packet structures depicted in FIG. 5. In the systems of any combinations a portion of each of the packet presence signal, the routing signal and the packet end signal is subjected to the photoelectric conversion, but their original signals are transmitted intact to the subsequent stage, and since the high-speed data signal is not subjected at all to the photoelectric conversion, the high-speed property of light is fully utilized. In the packet structures shown in FIGS. 5C and 5D, the respective routing pulses may be multiplexed so that they appear in the same time slot.

Figure 14:
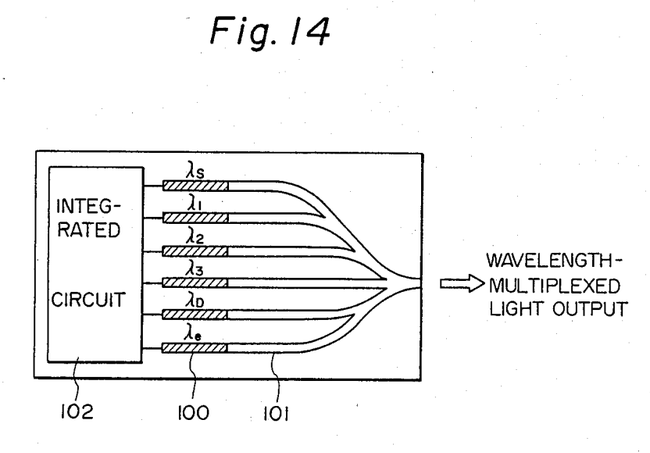
FIG. 14 is a schematic diagram of an integrated light source for use in the system of the present invention.

The light source for the optical packet switching system according to the present invention is implemented by an arrangement such, for example, as shown in FIG. 14, in which single-wavelength distributed feedback (DFB) semiconductor lasers 100, which operate at different wavelengths, are integrated in a monolithic form and their optical outputs are multiplexed via low-loss waveguides 101. Reference numeral 102 indicates an integrated circuit including a circuit for adjusting the timing for the power supply to each laser so that each packet structure shown in FIGS. 5A to 5D is obtained.

As described above in detail, according to the present invention, since the switch closing operation is carried out in accordance with the presence or absence of an optical signal of a particular wavelength, the packet signal, which is transferred as an optical signal, can be switched intact without its conversion to an electrical signal; namely, the present invention does not involve the photoelectric conversion, and hence simplifies the arrangement of the packet switch and permits high-speed packet switching which takes full advantage of the high-speed property of light. Moreover, an integrated optical communication network can be constructed by forming a wide band integrated communication network using the optical packet switch of the present invention and optical transmission lines; therefore, the present invention is of great utility in practical use.

What we claim is:

1. An optical packet switching system for switching optical packets each of which an information part and a packet end code of optical signals and an optical routing signal of a wavelength-multiplexed optical signal, the optical packet switching system comprising a switching network receptive of the optical packets and formed by a multi-stage combination of light triggering switches turned ON or OFF depending on the presence or absence respectively of a predetermined wavelength of the routing signal in the wavelength-multiplexed optical signal.

2. An optical packet switching system according to claim 1, in which each of the light triggering switches comprises a filter for branching a portion of the optical routing signal of a predetermined wavelength, and an electrically-controlled optical switch which converts the branched optical routing signal into an electrical signal and switches the corresponding optical packet to a desired output optical path in accordance with the intensity of the converted electrical signal.

3. An optical packet switching system according to claim 1, in which each of the light triggering switches comprises a branching filter for branching a portion of the optical routing signal of a predetermined wavelength, and a nonlinear reflector type optical switch for switching the corresponding optical packet to a desired output optical path in accordance with the intensity of the branched portion of the optical routing signal.

4. An optical packet switching system according to claim 1, in which each of the light triggering switches comprises an optical memory for storing an input optical packet with low priority for output along an output optical path, and a branching filter for branching a portion of the optical routing signal of a predetermined wavelength, and an electrically-controlled optical switch which converts the portion of the branched optical routing signal into an electrical signal and switches the corresponding optical packet to a desired output optical path in accordance with the intensity of the converted electrical signal.

5. An optical packet switching system according to claim 1, in which each of the light triggering switches comprises an optical memory section for storing one of the input optical packets of said optical packets which has a low priority for output to a desired optical path, a branching filter for branching a portion of the optical routing signal of a predetermined wavelength, and a nonlinear reflector type optical switch for switching individual optical packets to the desired output optical path in accordance with the intensity of the branched optical routing signal.

* * * * *